(12) United States Patent
Sakita et al.

(10) Patent No.: US 10,228,499 B2
(45) Date of Patent: Mar. 12, 2019

(54) OPTICAL COMPONENT AND IMAGING DEVICE USING SAME

(71) Applicant: Maxell, Ltd., Kyoto (JP)

(72) Inventors: Koichi Sakita, Tokyo (JP); Mitsuhiko Oota, Tokyo (JP); Takeshi Shimano, Tokyo (JP)

(73) Assignee: Maxell, Ltd., Kyoto (JP)

( * ) Notice: Subject to any disclaimer, the term of this patent is extended or adjusted under 35 U.S.C. 154(b) by 4 days.

(21) Appl. No.: 15/306,512

(22) PCT Filed: Apr. 28, 2014

(86) PCT No.: PCT/JP2014/061902
§ 371 (c)(1),
(2) Date: Oct. 25, 2016

(87) PCT Pub. No.: WO2015/166539
PCT Pub. Date: Nov. 5, 2015

(65) Prior Publication Data
US 2017/0045653 A1 Feb. 16, 2017

(51) Int. Cl.
*G02B 5/18* (2006.01)
*H04N 13/204* (2018.01)
*G02B 3/08* (2006.01)
*G02B 27/00* (2006.01)
*G02B 27/46* (2006.01)
(Continued)

(52) U.S. Cl.
CPC ............. *G02B 5/1876* (2013.01); *G02B 3/08* (2013.01); *G02B 13/005* (2013.01); *G02B 27/0025* (2013.01); *G02B 27/0075* (2013.01); *G02B 27/46* (2013.01); *H04N 5/2254* (2013.01); *H04N 13/204* (2018.05); *H04N 2213/001* (2013.01)

(58) Field of Classification Search
CPC ................................................ G02B 5/1876
USPC ......................... 359/565, 571, 574, 573, 569
See application file for complete search history.

(56) References Cited

U.S. PATENT DOCUMENTS

| 5,748,371 A | 5/1998 | Cathey, Jr. et al. |
| 5,980,454 A * | 11/1999 | Broome ............ A61B 1/05 |
| | | 359/565 |
| 2007/0097253 A1 | 5/2007 | Woo et al. |

FOREIGN PATENT DOCUMENTS

| JP | 2007-122055 A | 5/2007 |
| WO | 2006/137355 A1 | 12/2006 |

OTHER PUBLICATIONS

International Search Report of PCT/JP2014/061902 dated Jul. 8, 2014.

* cited by examiner

*Primary Examiner* — Audrey Y Chang
(74) *Attorney, Agent, or Firm* — Mattingly & Malur, PC

(57) ABSTRACT

To provide an optical component (phase plate) capable of acquiring an image of a deep depth of field or focal position, and an imaging device using it. What is provided is the optical component that includes multiple ring zones demarcated by multiple concentric circles, and is configured to be rotationally symmetric to a center of the concentric circles. Cross sections of the ring zones on a plane being parallel to a direction perpendicular to the concentric circles and including the center have concave or convex shapes. Each of the concave or convex shapes of the cross sections of the ring zones is asymmetric to a centerline of a width of each of the ring zones in a radial direction of the concentric circles.

13 Claims, 11 Drawing Sheets

(51) Int. Cl.
*H04N 5/225* (2006.01)
*G02B 13/00* (2006.01)

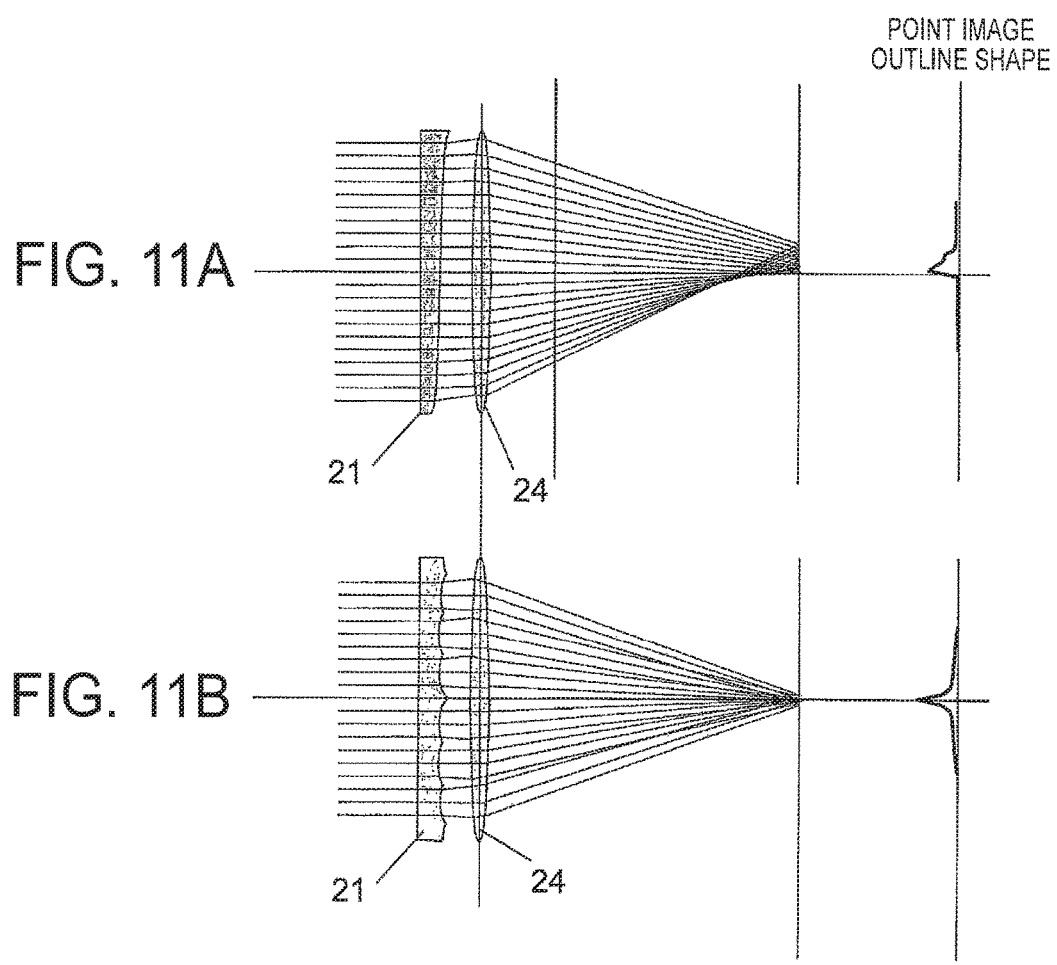

OPTICAL COMPONENT AND IMAGING DEVICE USING SAME

TECHNICAL FIELD

The present invention relates to an optical component used in order to expand a depth of field or expand a depth of focus, and an imaging device using it.

BACKGROUND ART

As a background art of this technical field, there is known an art that is described in U.S. Pat. No. 5,748,371 (Patent Literature 1), for example. This Patent Literature 1 discloses an art whereby an optical mask for modulating a phase of light is disposed in an optical system, and a point spread function (PSF, hereinafter referred to as "PSF") is made substantially invariant within a finite distance range from an in-focus position, so that the depth of field or the depth of focus is expanded.

Although sharpness of an image picked up by the optical system in the above-mentioned Patent Literature 1 deteriorates not only in a position away from the in-focus position but also in the in-focus position, since the PSF is substantially invariant in the in-focus position and in the position away from the in-focus position, it is possible to remove deterioration of the sharpness by signal processing based on information of the above-mentioned PSF and to expand the depth of field.

CITATION LIST

Patent Literature

Patent Literature 1: U.S. Pat. No. 5,748,371

SUMMARY OF THE INVENTION

Technical Problem

As being disclosed in the above-mentioned Patent Literature 1 etc., the optical phase mask in the conventional technology is designed to modulate a phase in directions that mutually cross at right angles horizontally and vertically in a plane intersecting perpendicularly to the optical axis, and it is non-rotationally symmetric to the optical axis. However, since many optical lenses are rotationally symmetric to their optical axes, the above-mentioned non-rotationally symmetric phase mask needs not only axial displacement, such as eccentricity, but also adjustment in a rotation direction, and therefore there is an issue that this reduces a permissible range of design error of the whole optical system. Incidentally, FIG. 11 (a) shows a point image outline shape when an optical phase mask (21) in the above-mentioned conventional technology is used.

To these issues, an axially symmetric optical phase mask that has multiple ring zones and makes a distribution of the whole PSF along an optical axis direction uniform by making contributional components of respective ring zones to the PSF uniform to the optical axis direction so as to enlarge a depth of focus can be considered. Here, one ring zone has a concave or convex cross section, and is divided into an inner part and an outer part by a circle having maximum values or minimum values of the convex/concave, and each of these parts has a part of a positive or negative gradient. Since a gradient of the concave/convex vertex of each ring zone is zero, a group of light rays passing through the vertex concentrates to a single point on the axis, while light rays passing through a portion in the concave/convex having a positive gradient pass through a point closer to (further from) an image than the above-mentioned light concentration point on the axis or its vicinity and light rays passing through a portion in the concave/convex having a negative gradient pass through a point further from (closer to) an image than the above-mentioned light concentration point on the axis or its vicinity, and therefore it becomes possible to bring the PSF to a uniform state in the optical axis direction. Incidentally, FIG. 11 (b) shows a point image outline shape when this axially symmetric optical phase mask (21) is used.

However, in fact, since when total amounts of light flux passing through the inner part and the outer part of one ring zone are compared, the total amount of light flux passing through the outer part is larger than the total amount of light flux passing through the inner part, the PSF cannot be equalized to the optical axis direction; therefore, an axially symmetric phase mask that is compatible with many optical lenses being axially symmetric cannot be realized. Therefore, in the case where such an axially symmetric ring zone phase plate was used, when an image plane or an image pickup object moves forward or backward from an in-focus position, an image of a deep depth of field or depth of focus was not able to be acquired because of an intensity distribution of the PSF along the axial direction.

Therefore, the present invention provides an optical component (phase plate) capable of acquiring an image of a deep depth of field or focal position, and an imaging device using it.

Solution to Problem

In order to achieve the above-mentioned object, according to the present invention, an optical component includes a plurality of ring zones demarcated by a plurality of concentric circles, and is configured to be rotationally symmetric to a center of the concentric circles. Cross sections of the ring zones on a plane being parallel to a direction perpendicular to the concentric circles and including the center have concave or convex shapes. Each of the concave or convex shapes of the cross sections of the ring zones is asymmetric to a centerline of a width of each of the ring zones in a radial direction of the concentric circles.

Moreover, according to the present invention, an imaging device includes an optical component that has a plurality of ring zones demarcated by a plurality of concentric circles, and is configured to be a rotationally symmetric to a center of the concentric circles. Cross sections of the ring zones on a plane being parallel to a direction perpendicular to the concentric circles and including the center have concave or convex shapes. Each of concave or convex shapes of the cross section of the ring zones is asymmetric to a centerline of a width of each of the ring zones in the radial direction of the concentric circles.

Advantageous Effect of Invention

According to the present invention, the image of the deep depth of field or depth of focus can be acquired.

BRIEF DESCRIPTION OF DRAWINGS

FIG. 11 is a diagram showing point image outline shapes using a non-rotationally symmetric phase plate in the conventional technology and using an axially symmetric phase plate having ring zones.

DESCRIPTION OF EMBODIMENTS

Hereinafter, embodiments of the present invention are explained using drawings.

First Embodiment

Figure 1:
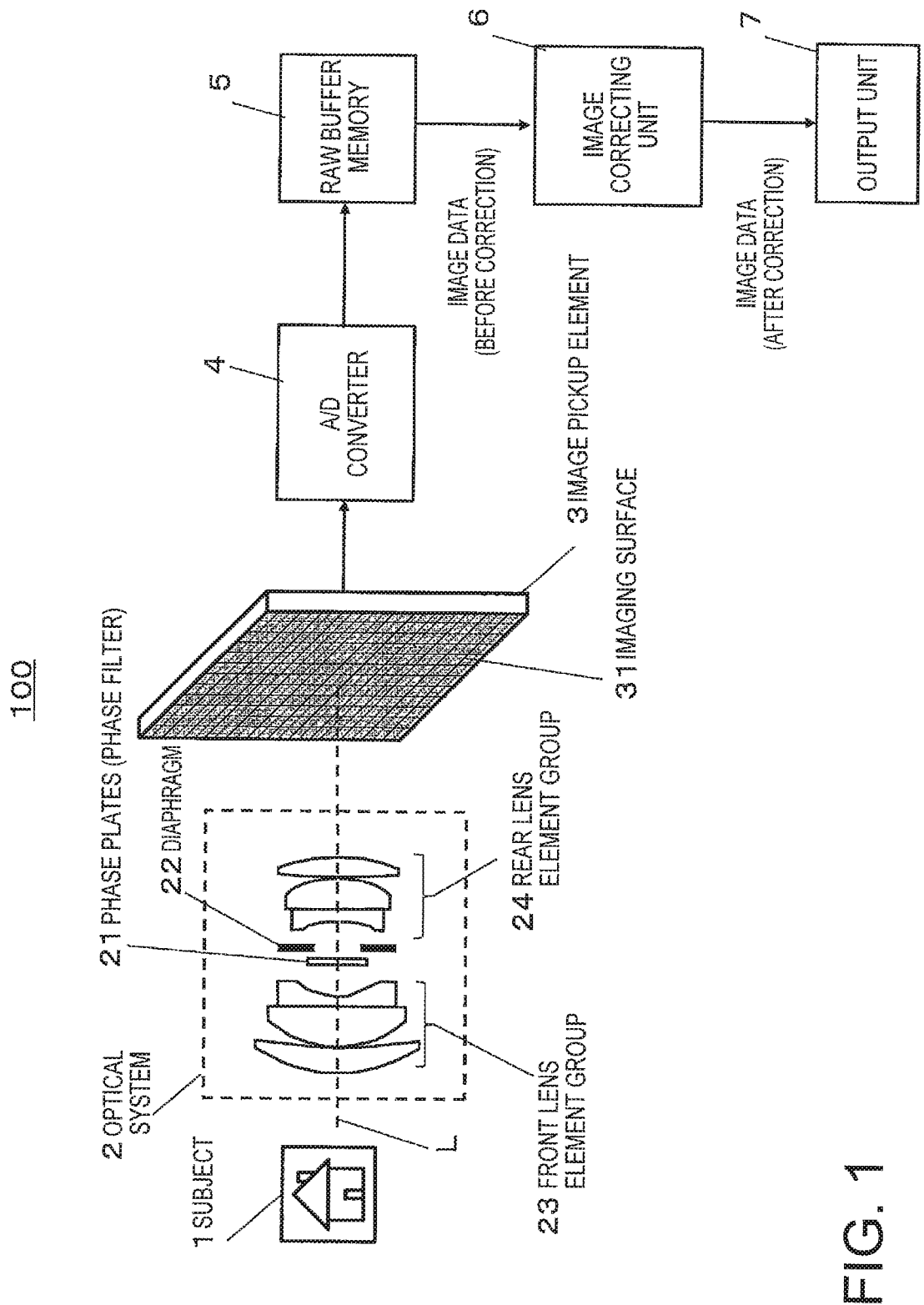
FIG. 1 is a diagram showing a configuration of an imaging device using an optical component (phase plate) of the present invention.

FIG. 1 is a diagram for explaining one configuration example of an imaging device according to this embodiment. An imaging device 100 according to this first embodiment is applicable to, for example, an AV camera, a camera mounted on a mobile phone, a camera mounted on a personal digital assistant, an image test device, an industrial camera for automatic control, etc.

An optical image of a subject 1 is taken in by an optical system 2, and is picked up by an image pickup element 3. Here, the optical system 2 is an element for taking in the optical image of the subject 1, and is provided with a front lens element group 23 that includes multiple lens elements located on the subject 1 side; a rear lens element group 24 that includes multiple lens elements located on the image pickup element 3 side; a diaphragm 22 that is disposed between the front lens element group 23 and the rear lens element group 24, and has a rectangular (square) opening or circular opening according to the optical system 2; and a phase plate 21 (optical component) that is disposed near a diaphragm 22 on the front lens element group 23 side, and acts as an optical phase filter for giving a predetermined optical transfer function by modulating the optical image of the subject 1 spatially.

This phase plate 21 is an optical component made of a transparent resin, such as acryl and polycarbonate, for example. Details of it optical characteristics are described later.

The optical image of the subject 1 obtained through the optical system 2 including the above-mentioned phase plate 21 is imaged on an imaging surface 31 of the image pickup element 3 and is taken therein. Here, the image pickup element 3 is configured with a CCD, a CMOS sensor, etc., for example, and takes in the image at a cycle of 1/60 second or 1/30 second, for example. That is, the imaging device according to this first embodiment is applicable also to photographing a moving image.

The optical image that is imaged on the imaging surface 31 of this image pickup element 3 and is taken therein is converted into an analog signal by the image pickup element 3, and is further converted into a digital signal by an A/D converter 4 to form image data corresponding to the optical image.

The image data from the A/D converter 4 is stored in RAW buffer memory 5 as an intermediate image. The image data stored in the RAW buffer memory 5 is read by an image correcting unit 6 that is a signal processing unit for performing two-dimensional spatial filter processing.

In the image correcting unit 6, the two-dimensional spatial filter processing as image restoration processing is carried out according to the optical transfer function that is defined by an optical modulation characteristic of the phase plate 21 included in the above-mentioned optical system 2. That is, the image correcting unit 6 performs the image restoration processing so as to correct the optical transfer function that is given to the optical image by the phase plate 21. For example, in the case where the phase plate 21 gives the optical transfer function that blurs the optical image of the subject 1 almost by a constant degree in each position within a predetermined distance range on an optical axis L (for example, a dotted line L of FIG. 1) to the optical image, the image correcting unit 6 performs processing of taking away the above-mentioned blur and restoring it to a sharp image by emphasizing or increasing/decreasing a specific frequency component of the optical image that has the optical transfer function like this.

In order to perform such two-dimensional spatial filter processing, the image correcting unit 6 is provided with a ROM (not illustrated) acting as a storage unit for storing filter information, such as predetermined spatial filter coefficients. Then, the image correcting unit 6 reads filter information stored in this ROM, and performs the two-dimensional spatial filter processing as the image restoration processing on the image data.

An unillustrated different image processing unit performs, for example, a contrast adjustment, a brightness adjustment, a color calibration, if needed, and further scaling processing such as enlargement and reduction, and also, if needed, a frame rate conversion processing, etc. to the data outputted from the image correcting unit 6. The image data thus processed is supplied to an output unit 7.

This first embodiment uses a phase filter of a structure having multiple concentric ring zones as the phase plate 21 included in the optical system 2 in an imaging device or imaging system of a configuration as described above. Then, according to this first embodiment, on a cross section of the phase plate 21 on a plane parallel to the optical axis (axis penetrating the center of the concentric circles), namely, on a cross section thereof on a plane being parallel to a direction perpendicular to the above-mentioned concentric circles and including the center, each ring zone has an asymmetric shape to the center of a width of the each ring zone, namely, to a centerline of a width of the ring zone in a radial direction of the concentric circles. An optical axis direction is a direction perpendicular to multiple concentric circles that demarcate multiple ring zones. Hereinafter, details of this are explained referring to FIG. 2 to FIG. 8.

Figure 2:
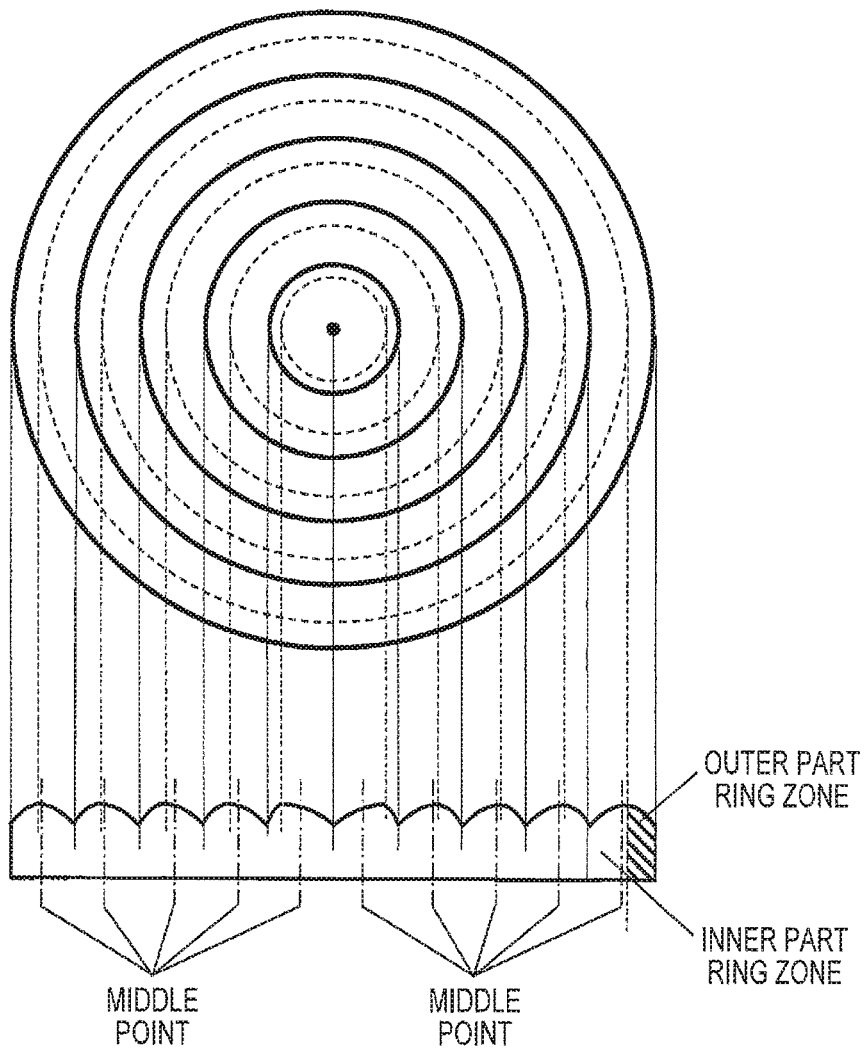
FIG. 2 is a diagram showing a structure of a phase plate in a first example of the present invention.
Figure 3:
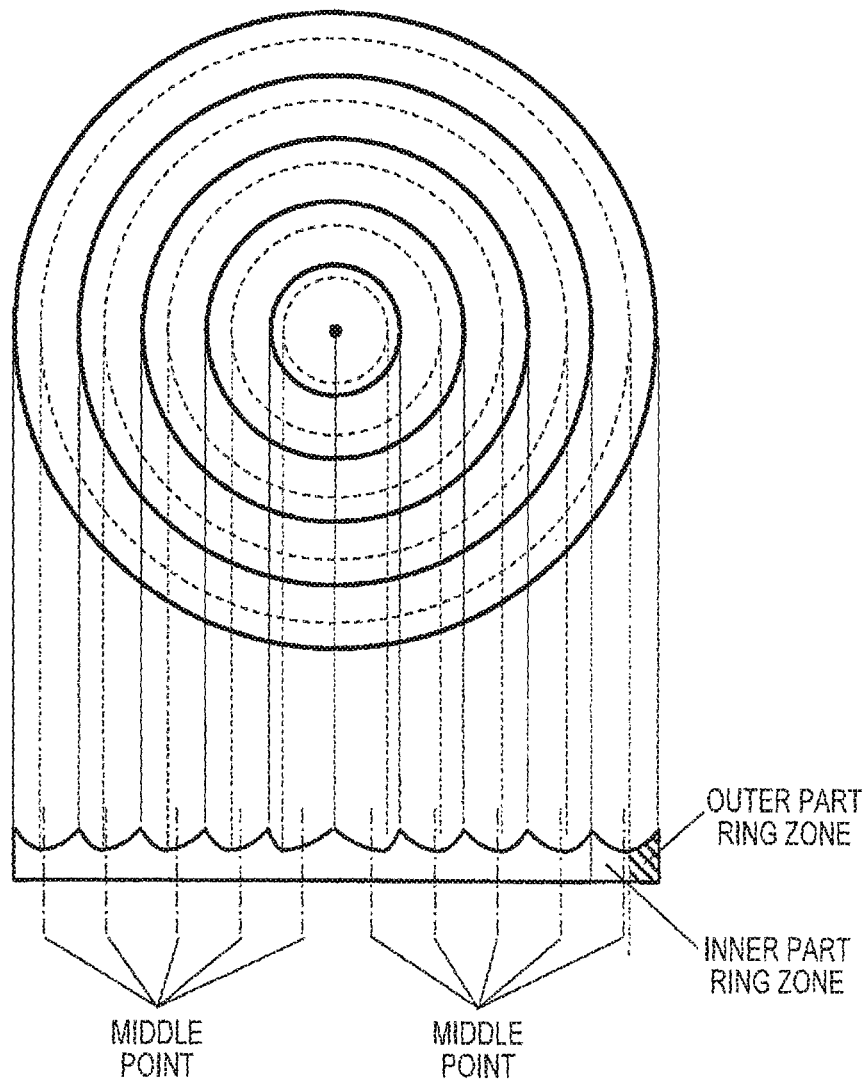
FIG. 3 is a diagram showing a structure of a phase plate in a modification (a first modification) of the first example.
Figure 4:
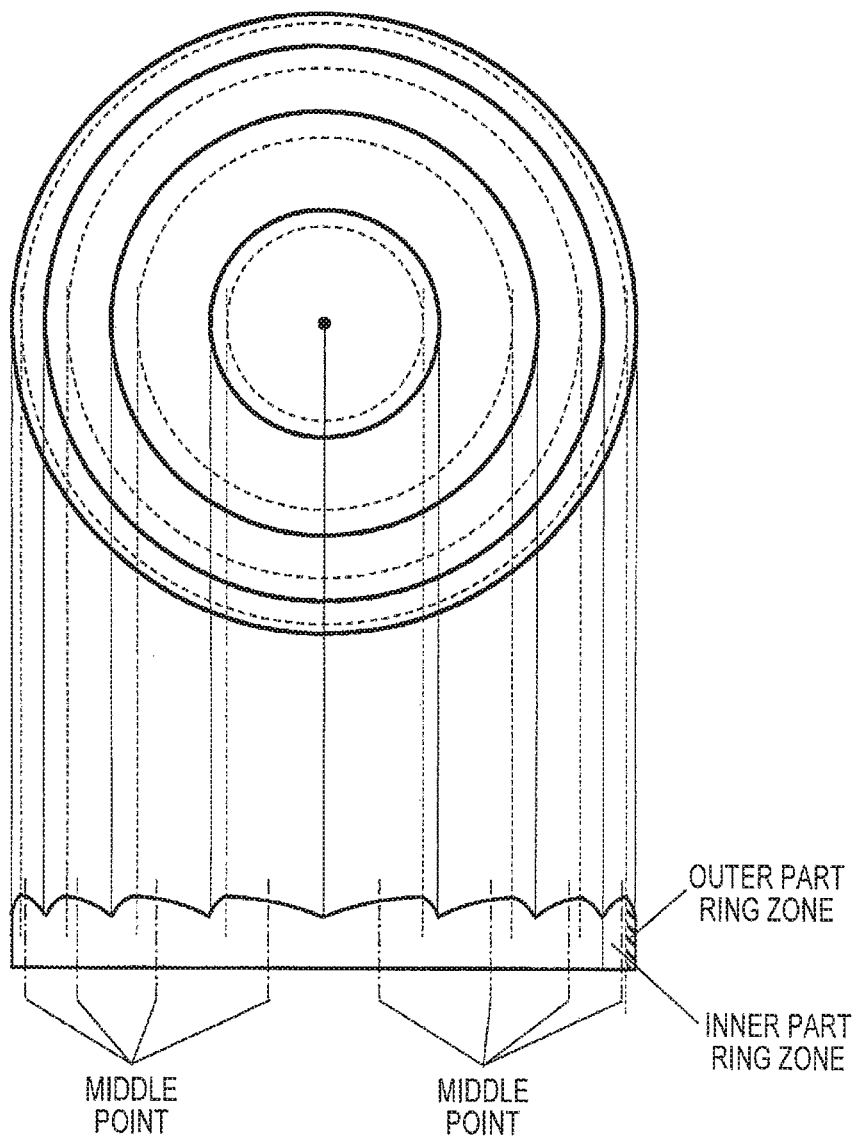
FIG. 4 is a diagram showing a structure of a phase plate in a modification (a second modification) of the first example.
Figure 5:
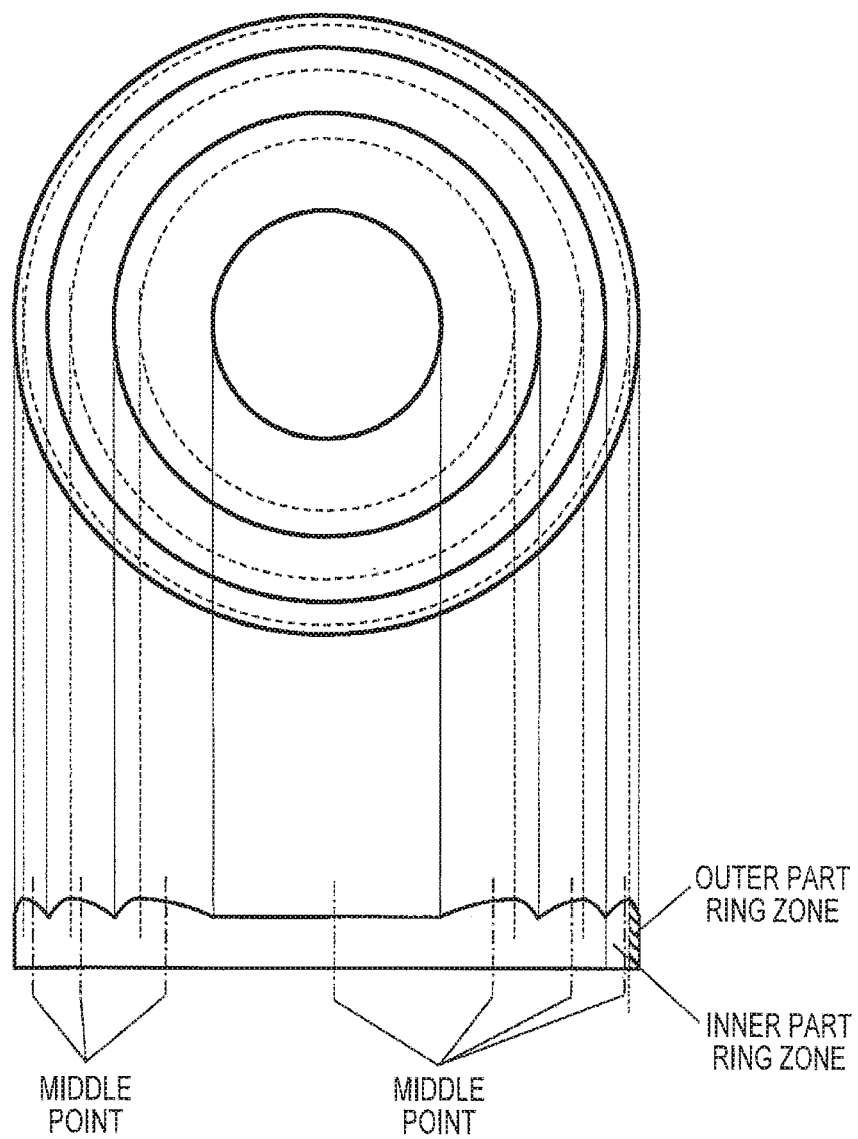
FIG. 5 is a diagram showing a structure of a phase plate in a modification (a third modification) of the first example.

FIG. 2 shows an example of a structure of an axially symmetric phase filter of this first embodiment. In this first embodiment, widths of each ring zone (a maximum size in the radial direction on the above-mentioned cross section)

are set to be equal. Assuming that the cross-sectional shape of each ring zone has a convex shape and an i-th ring zone is specified by concentric circles of a radius $r_i$ and a radius $r_{i+1}$, a radius $r_{ci}$ of the circle including points at which the convex is a maximum is configured so as to satisfy $$r_{ci} = \text{sqr}\{(r_i^2 + r_{i+1}^2)/2\} \quad \text{(Formula 1)}$$

and the each ring zone is configured so as to be divided into an inner part ring zone and an outer part ring zone by a circle consisting of points at which the convex is a maximum to equalize areas of the above-mentioned inner part ring zone and outer part ring zone. Consequently, a circle consisting of points at which the convex is a maximum will be positioned outside a circle specified by middle points of each ring zone. Since the inner part ring zone and the outer part ring zone (for explanation, hatching is given to some of the outer part ring zone in FIG. 2) of each ring zone are different in width, the convex shape will be asymmetric at maximum points serving as a boundary.

As shown in FIG. 2, each ring zone is configured so that [curvature of the inner part zone<curvature of the outer part zone] may be satisfied, and positions at which the ring zone is a maximum is positioned outside a center point.

The concave/convex shape of the ring zone may have a convex shape like this first embodiment (FIG. 2), or may have a concave shape like a first modification (FIG. 3) that is a modification of this first embodiment. Moreover, as one example is shown in each of FIG. 7 to FIG. 9, a direction of the phase plate 21 may be reversed (in a direction in which it is turned over). In either case of the above-mentioned cases, each ring zone is configured so that [curvature of the inner part zone<curvature of the outer part zone] may be satisfied and positions at which the convex/concave is a maximum or is a minimum in each ring zone are located outside the center point. Also in FIG. 3, hatching is given to some of the outer part ring zones.

Figure 6:
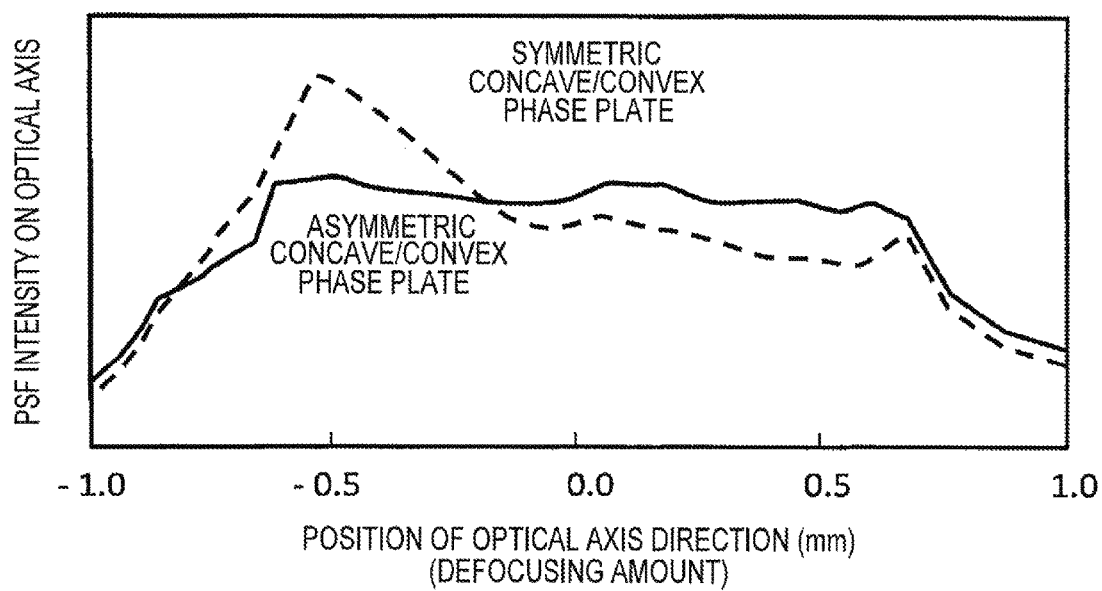
FIG. 6 is a diagram explaining an effect when the phase plate in the first example of the present invention is used.

FIG. 6 shows the PSF along the optical axis direction calculated using the optical phase plate (the phase plate 21) of this first embodiment assuming that the subject 1 is positioned at a distance of 1 m. In order to perform comparison of the PSF (shown by a solid line) when the phase plate 21 by this first embodiment is used, the PSF (shown by a solid line) when the phase plate 21 having a symmetric concave/convex cross-sectional shape is used is also shown together.

When the phase plate 21 having the symmetric concave/convex cross-sectional shape is used, directing attention to one ring zone and considering it, since the light rays passing through the outer part of the ring zone divided by convex maximum values that are in a portion of the convex part having a negative gradient have a large amount of light flux, the light intensity becomes strong when the position on the optical axis direction moves to a negative direction from the focus on the axis (position of "0.0" of the horizontal axis). Contrary to this, since the light rays passing through the inner part of the ring zone divided by the convex maximum values that are in a portion of the convex part having a positive gradient have a small amount of light flux; therefore, when the position moves to a positive direction from the focus on the axis, the light intensity become weak and will have an asymmetric distribution to a displacement in the axial direction.

On the other hand, in the case where the phase plate 21 by this first embodiment is used, that is, by making a convex shape horizontally asymmetric, a circle including points at which the convex is a maximum is positioned outside the circle specified by middle points of the each ring zone; therefore, amounts of light flux of light rays passing through the outer part of the ring zone that is divided by convex maximum values and through the inner part thereof can be equalized and it is possible to realize a uniform distribution even with existence of displacement in the axial direction.

Figure 7A:
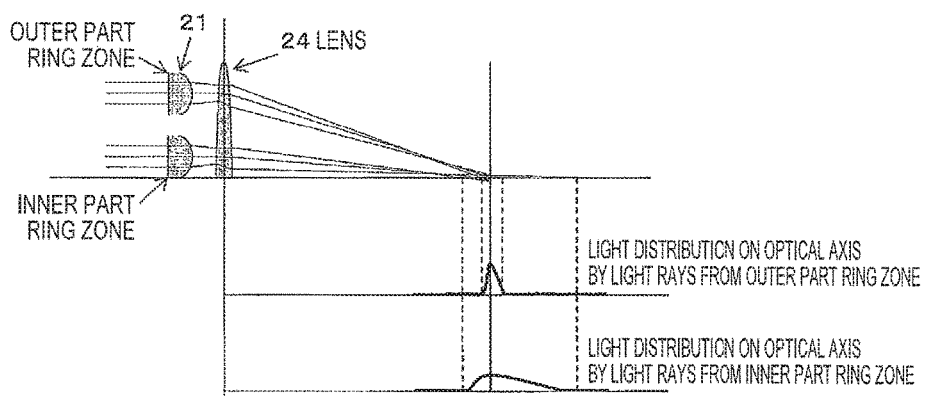
FIG. 7 is a diagram showing an outline of a light distribution on an optical axis when the phase plate in the first example of the present invention is used.
Figure 7B:
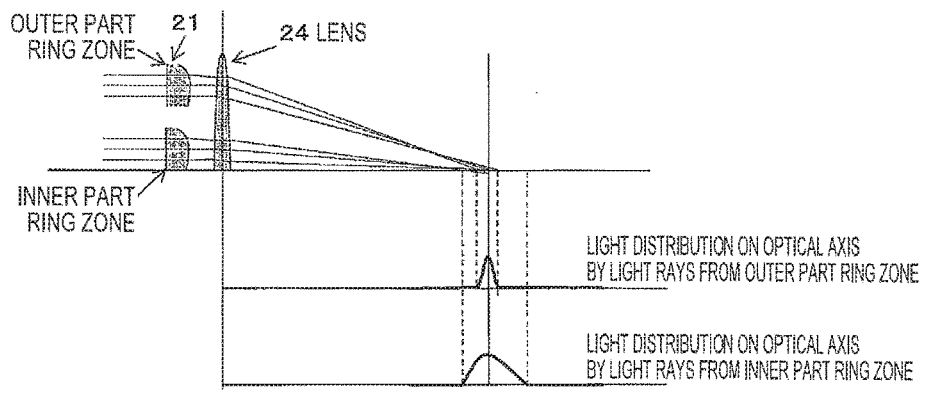
Figure 7C:
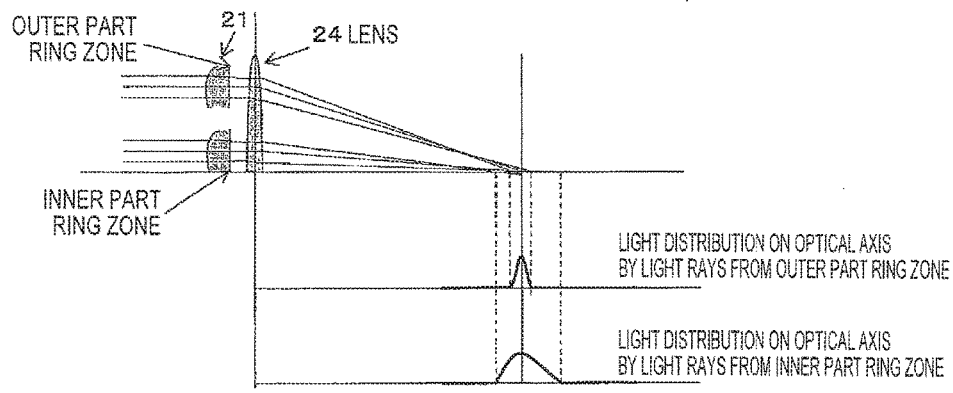

FIG. 7 includes diagrams showing outlines of: a light distribution (FIG. 7 (a)) on the optical axis when the phase plate having a symmetric convex cross-sectional shape is used as the conventional first embodiment; a light distribution (FIG. 7 (b)) on the optical axis when the phase plate 21 of this first embodiment is used; and a light distribution (FIG. 7 (c)) on the optical axis when the phase plate 21 of this first embodiment is used with a direction of the convex plane thereof reversed. In order to explain the outline, the phase plate 21 and the rear lens element group 24 are illustrated by being simplified.

Although in the above-mentioned conventional first example, for example, a group of light rays passing through the vertex of the ring zone focuses to a single point on the axis; light rays passing through the outer part ring zone pass through a point closer to the image side than the above-mentioned light concentration point on the axis, light rays passing through the inner part ring zone pass through a point further from the image side than the above-mentioned light concentration point, and especially, the light rays passing through the inner part ring zone have a larger distribution range on the optical axis (the degree of variation is large).

On the other hand, in this first embodiment, especially a distribution range on the optical axis in which the light rays passing through the inner part ring zone is markedly smaller than the range in the above-mentioned conventional first embodiment (the degree of variation is small). Also when the phase plate 21 of this first embodiment is used with a direction of the convex plane thereof reversed, similarly with the case of this first embodiment, especially, a distribution range on the optical axis in which light rays passing through the inner part ring zone is remarkably smaller than the range in the above-mentioned conventional first embodiment (the degree of variation is made small).

Figure 8A:
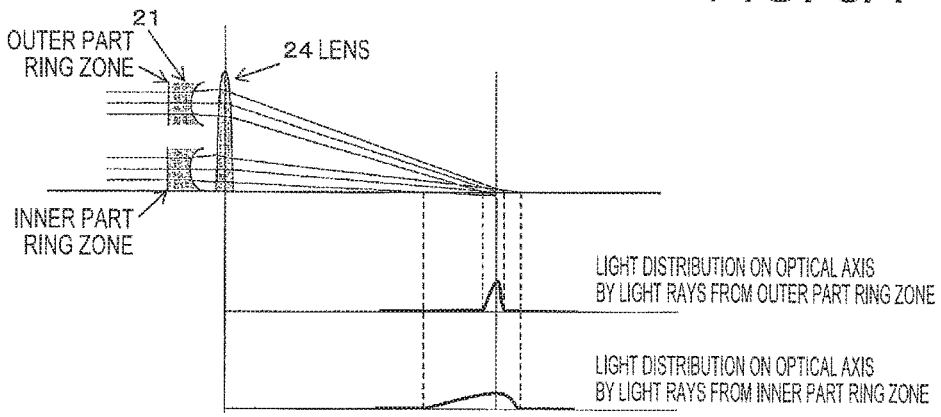
FIG. 8 is a diagram showing an outline of a light distribution on the optical axis when the phase plate in the first modification is used.
Figure 8B:
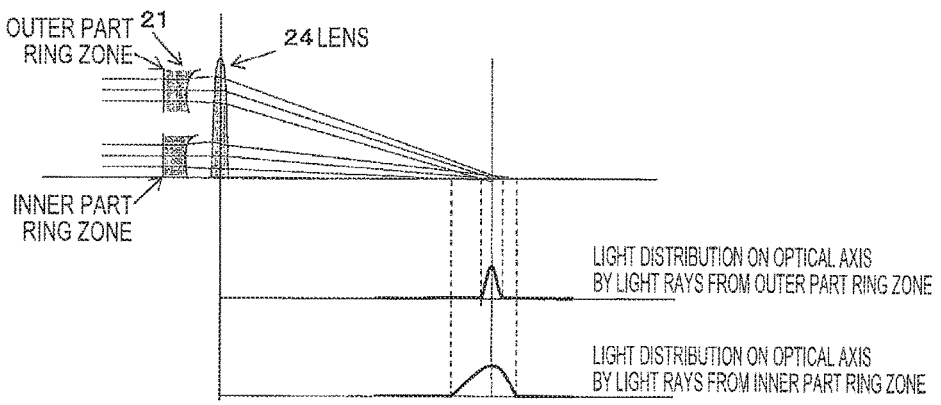
Figure 8C:
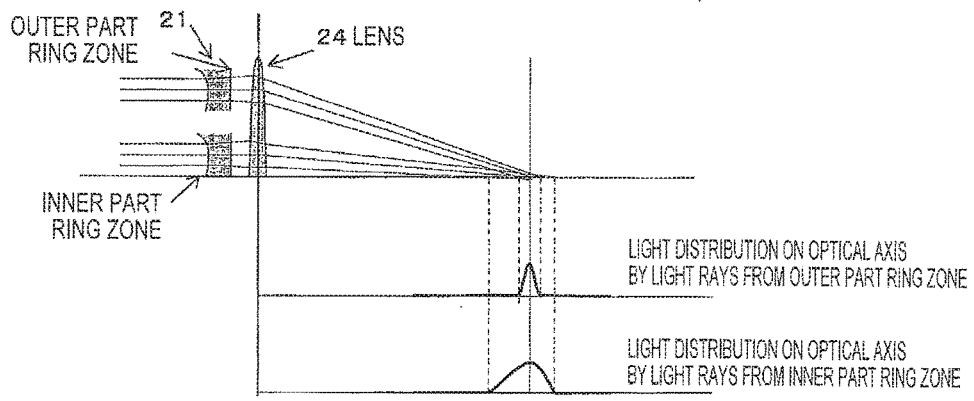

Moreover, FIG. 8 includes diagrams showing outlines of: a light distribution (FIG. 8 (a)) on the optical axis when the phase plate having a symmetric concave cross-sectional shape is used as the conventional second embodiment; a light distribution (FIG. 8 (b)) on the optical axis when the phase plate 21 of the first modification is used; and a light distribution (FIG. 8 (c)) on the optical axis when the phase plate 21 of the first modification is used with a direction of the concave plane thereof reversed. In order to explain the outline, the phase plate 21 and the rear lens element group 24 are illustrated by being simplified.

In the above-mentioned conventional second embodiment, for example, although the group of light rays passing through the vertex of the ring zone focuses to a single point on the axis, light rays passing through the outer part ring zone pass through a point closer to the image side than the above-mentioned light concentration point on the axis, light rays passing through the inner part ring zone pass through a point further from the image side than the above-mentioned light concentration point, and especially, the light rays passing through the inner part ring zone have a larger distribution range on the optical axis (the degree of variation is large).

On the other hand, in the first modification, especially, a distribution range on the optical axis in which the light rays passing through the inner part ring zone is markedly smaller than the range in the above-mentioned conventional second embodiment (the degree of dispersion is small). Also when the phase plate 21 of this first embodiment is used with the direction of the concave plane thereof reversed, similarly with the case of this first embodiment, especially, a distribution range on the optical axis in which the light rays passing through the inner part ring zone is markedly smaller than the range in the above-mentioned conventional second embodiment (the degree of variation is small).

Thus, in the case where the phase plate 21 in this first embodiment and the first modification is used, even if a direction of the concave/convex surface is either of a forward direction or of a reverse direction, the above-mentioned degree of variation is small and therefore, it is possible to make a distribution of the PSF along the optical axis direction close to a uniform state. The direction of the concave-convex plane of the phase plate 21 may be either of a forward direction or of a reverse direction (that is, the direction of the phase plate 21 may be reversed inside out).

In the above explanation, it is assumed that all the ring zone widths should be equal, however, it is important that the concave/convex shape of each one of the ring zones is asymmetric, and the phase plate 21 may take such a shape that the amounts of light flux of each ring zones are the same. Concretely, this configuration is also applicable to a phase plate whose ring zone width decreases monotonously from the inside toward the outside like a second modification (FIG. 4) that is a modification of this first embodiment.

For example, the phase plate may be a phase plate that has the concave/convex cross-sectional shape only in a part thereof like a third modification (FIG. 5) that is a modification of this first embodiment. Also in FIG. 4 and FIG. 5, hatching is given to some of the outer part ring zones.

Thus, according to this first embodiment and the first to third modifications, the following effects can be achieved.

That is, even when an image plane or an image pickup object moves forward or backward from the in-focus position within a predetermined range, an image with a small variation of the PSF (namely, an image of a similar degree of blurring at positions before and behind the in-focus position) can be picked up, and as a result, an image of a deep depth of field or depth of focus can be acquired.

Moreover, since the phase plate 21 is rotationally symmetric to the optical axis, it is compatible with many optical systems, an adjustment of the rotation direction centering on the optical axis is unnecessary, and design accuracy and manufacture accuracy of the whole optical system can be relaxed.

Furthermore, since the PSF spreads on the image plane isotropically, a restored image by signal processing does not have directivity, which results in not only suppressing occurrence of a ghost image but also reducing memory for storing a coefficient matrix used in the signal processing, thereby making it possible to miniaturize a signal processing circuit.

Furthermore, since the phase plate 21 has a rotationally symmetric shape, the metallic mold used for fabrication thereof also becomes a rotationally symmetric shape, which enables rotational turning processing; therefore it becomes possible to shorten a machining time and to reduce a manufacturing cost.

In this first embodiment and each modification (modifications 1 to 3), the phase plate 21 uses fused silica of a refractive index n1, and the concave/convex is formed in each ring zone using a pattern formation technology and an etching technique. Incidentally, the concave/convex (especially, a slot serving as the concave) may be formed by performing slot processing using a hard cutting tool as diamond, not by using such a technology. Furthermore, the phase plate may be formed by forming a thick plate having concave/convex as a metallic mold and then by injection molding plastic using this metallic mold. The phase plate may be formed by providing a ring zone-shaped convex part or a ring zone-shaped concave part of a refractive index n1 on a transparent planar substrate.

An influence of defocusing aberration caused by defocus is made invisible in this first embodiment and each modification by intentionally giving a larger aberration than the defocusing aberration resulting from defocus. Although the maximum value of the defocusing aberration in the usual optical system is 1/4 of a wavelength $\lambda$ (namely, $\lambda/4$), in order to keep the influence invisible when a defocusing aberration larger than this (for example, $\lambda$) is added, a height of the concave/convex shape having a curvature needs to be larger than or equal to the wavelength $\lambda$. Therefore, it is necessary to set the height of the concave/convex shape having the curvature to the above-mentioned $\lambda$ or more.

Second Embodiment

In this second embodiment, an example in which the distribution of the PSF along the optical axis direction can be made close to a uniform state only by asymmetry of the concave/convex shape, not using the widths of the inner part ring zone and the outer part ring zone.

Figure 9:
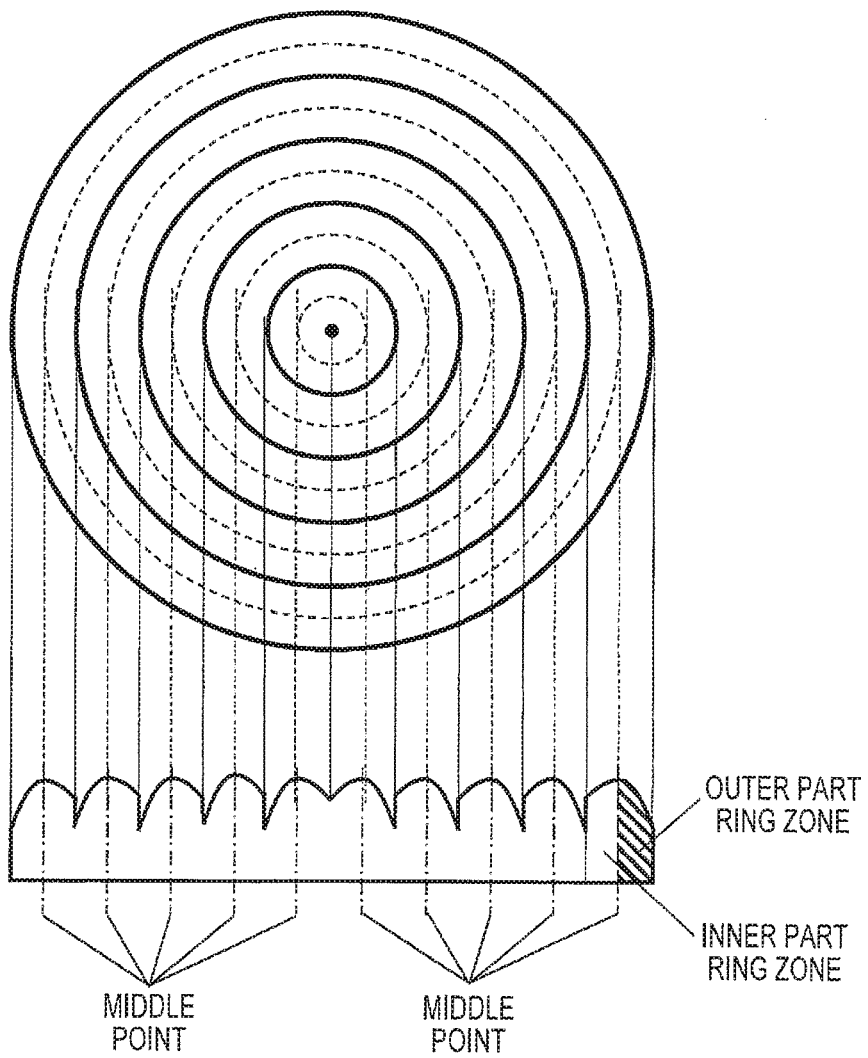
FIG. 9 is a diagram showing a structure of the phase plate in the second example of the present invention.

FIG. 9 is an example of a structure of an axially symmetric phase filter of this second embodiment.

In this second embodiment, widths of the inner part ring zone and the outer part ring zone are configured to be equal to a circle specified by the minimums or the maximums of the concave/convex. Since the widths of the outer part ring zone and the inner part ring zone are set to be equal, a total amount of light flux passing through the outer part ring zone is larger than a total amount of light flux passing through the inner part ring zone.

However, the inner part ring zone and the outer part ring zone are designed so that an absolute value of a gradient of the concave/convex shape may be larger in the outer part ring zone portion than in the inner part ring zone portion. As an absolute value of the gradient becomes larger, light rays passing through the portion goes away from the focus, and consequently light rays passing through the outer part ring zone whose gradient is large spread in the optical axis direction even when part ring zones are the same in area; therefore, the distribution of the PSF along the axial direction will be largely relaxed.

Although in this second embodiment, as shown in FIG. 9, there exists a level difference between the ring zones, the each ring zone may be configured to vary continuously by giving the each ring zone an offset portion like the fourth modification (FIG. 10) that is a modification of this second embodiment. Also in the case of this fourth modification, similarly with this second embodiment, the inner part ring zone and the outer part ring zone are designed so that the absolute value of the gradient of the concave/convex shape may be larger in the outer part ring zone portion than in the inner part ring zone portion. As an absolute value of the gradient becomes larger, light rays passing through the portion goes away from the focus, and consequently light rays passing through the outer part ring zone whose gradient is large spread in the optical axis direction even when part ring zones are the same in area; therefore, the distribution of the PSF along the axial direction will be largely relaxed.

Figure 10:
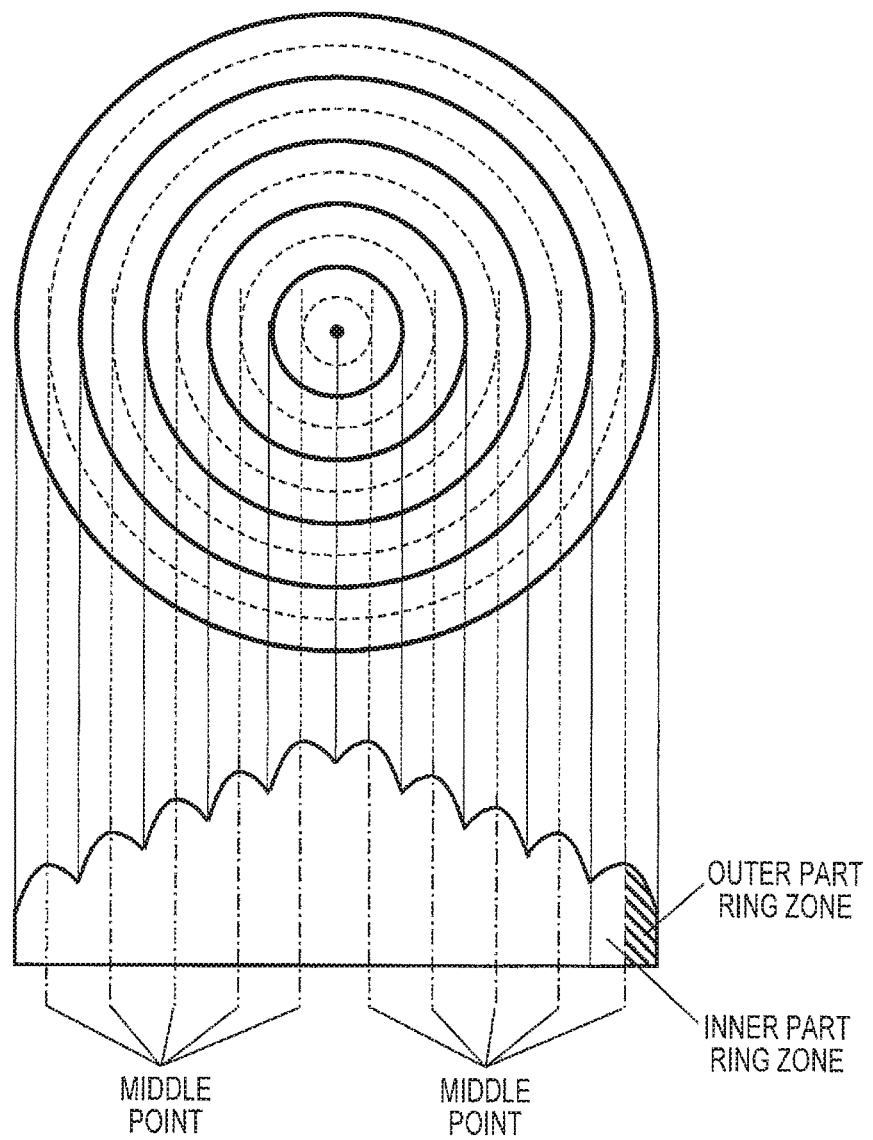
FIG. 10 is a diagram showing a structure of the phase plate in a modification (fourth modification) of the second example.

As shown in FIG. 9 and FIG. 10, although a position of a maximum point of the ring zone is set to be the center point, a curvature of each ring zone is configured so that [curvature of the inner part zone<curvature of the outer part zone] may be satisfied. Moreover, also in FIG. 9 and FIG. 10, hatching is given in some of the outer part ring zones.

Incidentally, the present invention is not limited to the above-mentioned examples (the first embodiment, the second embodiment) and modifications (the first modification to the fourth modification), but includes various modifications. For example, the above-mentioned examples and modifications were explained in detail in order to explain the present invention plainly, and the present invention is not necessarily limited to one that includes all the explained configurations.

Moreover, it is also possible to replace a part of a configuration of a certain example or modification with a configuration of another example or modification, and in addition, it is possible to add a configuration of another example or modification to a configuration of a certain example or modification. Moreover, it is possible to carry out supplement, deletion, and substitution of another configuration on a part of the configuration of each example or each modification.

REFERENCE SIGNS LIST

1 Subject
2 Optical System
3 Image pickup element
4 A/D converter
5 RAW buffer memory
6 Image correcting unit
7 Output unit
21 Phase plate (phase filter)
22 Diaphragm
23 Front lens element group
24 Rear lens element group
100 Imaging device

The invention claimed is:

1. An optical component comprising:
a plurality of ring zones demarcated by a plurality of concentric circles and which are configured to be rotationally symmetric relative to a center of the concentric circles, wherein:
the ring zones, in a cross section on a plane parallel to a direction perpendicular to the concentric circles and including the center of the concentric circles, consist of convex shapes,
for each of the ring zones, the respective convex shape thereof is asymmetric relative to a centerline of a width of the respective ring zone in a radial direction of the concentric circles,
for each of the ring zones, the respective convex shape thereof has a local maximum, wherein the local maximum defines a first circle which is positioned differently than a second circle defined by the centerline of the width of the respective ring zone,
for each of the ring zones, the respective ring zone is divided into an inner part ring zone and an outer part ring zone by the first circle, and areas of the inner part ring zone and the outer part ring zone are substantially equal.

2. The optical component according to claim 1, wherein: for each of the ring zones, the first circle is positioned outside the second circle of the respective ring zone.

3. The optical component according to claim 1, wherein: the widths of the ring zones decrease monotonically in the radial direction from the center.

4. The optical component according to claim 1, wherein: areas of the ring zones are substantially equal to each other.

5. An imaging device comprising:
an image pickup element;
a lens; and
an optical component that includes a plurality of ring zones demarcated by a plurality of concentric circles and which are configured to be rotationally symmetric relative to a center of the concentric circles, wherein:
the ring zones, in a cross section on a plane parallel to a direction perpendicular to the concentric circles and including the center of the concentric circles, consist of one of concave or convex shapes,
for each of the ring zones, the respective shape thereof is asymmetric relative to a centerline of a width of the respective ring zone in a radial direction of the concentric circles,
for each of the ring zones, the respective shape thereof has a local maximum or a local minimum, wherein the local maximum or the local minimum defines a first circle which is positioned differently than a second circle defined by the centerline of the width of the respective ring zone, and
for each of the ring zones, the respective ring zone is divided into an inner part ring zone and an outer part ring zone by the first circle, and areas of the inner part ring zone and the outer part ring zone are substantially equal.

6. The imaging device according to claim 5, wherein: for each of the ring zones, the first circle is positioned outside the second circle of the respective ring zone.

7. The imaging device according to claim 5, wherein: the widths of the ring zones decrease monotonically in the radial direction from the center.

8. The imaging device according to claim 5, wherein: areas of the ring zones are substantially equal to each other.

9. An optical component comprising:
a plurality of ring zones demarcated by a plurality of concentric circles, and which are configured to be rotationally symmetric with respect to a center of the concentric circles, wherein:
the ring zones, in a cross section on a plane parallel to a direction perpendicular to the concentric circles and including the center of the concentric circles, consist of concave shapes,
for each of the ring zones in the cross section, the respective concave shape thereof is asymmetric relative to a centerline of a width of the respective ring zone in a radial direction of the concentric circles,
for each of the ring zones, the respective concave shape thereof has a local minimum, wherein the local minimum defines a first circle which is positioned differently than a second circle defined by the centerline of the width of the respective ring zone, and
for each of the ring zones, the respective ring zone is divided into an inner part ring zone and an outer part ring zone by the first circle, and areas of the inner part ring zone and the outer part ring zone are substantially equal.

10. The optical component according to claim 9, wherein: for each of the ring zones, the first circle is positioned outside the second circle of the respective ring zone.

11. The optical component according to claim 9, wherein: widths of the ring zones decreases monotonically in the radial direction from the center.

12. The optical component according to claim 9, wherein: areas of the ring zones are substantially equal to each other.

13. An imaging device comprising:
an image pickup element;

an optical system including a plurality of lenses and a diaphragm; and an optical component that includes a plurality of ring zones demarcated by a plurality of concentric circles and which are configured to be rotationally symmetric relative to a center of the concentric circles, wherein:

the ring zones, in a cross section on a plane parallel to a direction perpendicular to the concentric circles and including the center of the concentric circles, consist of one of concave or convex shapes, for each of the ring zones, the respective shape thereof is asymmetric relative to a centerline of a width of the respective ring zone in a radial direction of the concentric circles, the optical component is disposed adjacent the diaphragm of the optical system, for each of the ring zones, the respective convex shape thereof has a local maximum or a local minimum, wherein the local maximum or the local minimum defines a first circle which is positioned differently than a second circle defined by the centerline of the width of the respective ring zone, and for each of the ring zones, the respective ring zone is divided into an inner part ring zone and an outer part ring zone by the first circle, and areas of the inner part ring zone and the outer part ring zone are substantially equal.

* * * * *